United States Patent
Nelson et al.

(10) Patent No.: US 7,318,610 B2
(45) Date of Patent: Jan. 15, 2008

(54) PICKING TOOL WITH CHANGEABLE END EFFECTOR

(75) Inventors: Linn E. Nelson, Portland, OR (US); Karl H. Zeller, Portland, OR (US)

(73) Assignee: Barnel International, Inc., Portland, OR (US)

(*) Notice: Subject to any disclaimer, the term of this patent is extended or adjusted under 35 U.S.C. 154(b) by 0 days.

(21) Appl. No.: 11/226,076

(22) Filed: Sep. 13, 2005

(65) Prior Publication Data

US 2007/0057519 A1    Mar. 15, 2007

(51) Int. Cl.
*B25J 1/00*    (2006.01)
(52) U.S. Cl. ........................ 294/19.1; 294/902
(58) Field of Classification Search ............... 294/88, 294/19.1, 902; 901/30, 31
See application file for complete search history.

(56) References Cited

U.S. PATENT DOCUMENTS

| | | | | |
|---|---|---|---|---|
| 2,326,962 | A * | 8/1943 | Meier | .......................... 294/118 |
| 2,616,741 | A | 11/1952 | Ziese | |
| 4,109,953 | A * | 8/1978 | Seymour | .................... 294/118 |
| 4,483,562 | A | 11/1984 | Schoolman | |
| 4,834,760 | A | 5/1989 | Richter, Jr. | |
| 4,962,957 | A * | 10/1990 | Traber | ......................... 294/19.1 |
| 5,174,300 | A | 12/1992 | Bales et al. | |
| 5,577,785 | A * | 11/1996 | Traber et al. | .............. 294/19.1 |
| 5,590,923 | A | 1/1997 | Berger et al. | |
| 5,765,453 | A | 6/1998 | Mims | |
| 6,257,634 | B1 | 7/2001 | Wei | |
| 6,454,330 | B1 | 9/2002 | Chen | |
| 6,513,844 | B1 | 2/2003 | Hsu | |
| 6,588,816 | B1 * | 7/2003 | Moilanen et al. | .............. 294/88 |
| 6,669,254 | B2 | 12/2003 | Thom et al. | |
| 6,848,731 | B2 | 2/2005 | Khubani et al. | |
| 6,874,833 | B2 | 4/2005 | Keith et al. | |
| 2003/0222467 | A1 * | 12/2003 | Khubani et al. | ........... 294/19.1 |
| 2004/0080169 | A1 * | 4/2004 | Khubani et al. | ........... 294/19.1 |
| 2004/0135387 | A1 | 7/2004 | Keith et al. | |

* cited by examiner

*Primary Examiner*—Saul Rodriguez
*Assistant Examiner*—Paul T Chin
(74) *Attorney, Agent, or Firm*—patenttm.us; James H. Walters (57) ABSTRACT

A picking tool employs a changeable end effector having first and second operative portions. A changing member allows selection of the first or the second portions for deployment during picking, such that the picking tool can be changed to different configurations of end effectors for varied uses. The changing member provides a locked position where the end effector is locked onto the picking tool for use and an unlocked position whereby the end effector may be removed and repositioned to present a different portion for operative use.

18 Claims, 13 Drawing Sheets

PICKING TOOL WITH CHANGEABLE END EFFECTOR

BACKGROUND OF THE INVENTION

This invention relates to picking tools, and more particularly for a manual picking tool having a changeable head contact portion and improved operation.

Tools for picking up items incorporate an articulatable gripping head portion with an elongate pole portion having an actuator at the end distal from the head, so that a user can hold the tool with one hand and actuate the head to close and clamp onto an item, for picking the item up by use of the same hand. This keeps the other hand free, which can be used to retrieve the item from the picking tool, if desired. Typical uses include picking up items from the ground, such as litter, for example, and for grasping items that would otherwise be out of reach, for example, items stored on shelves.

Some picking tools employ an actuator requiring the user to operation the tool by closing the fingers of one hand as a group, drawing the fingers toward the palm. However, since the same hand is holding the picking tool, this manner of operation puts an amount of strain on the user's wrist, such that long term use is uncomfortable, or such that the weight of items that can be picked up without wrist strain or pain is reduced considerably.

SUMMARY OF THE INVENTION

In accordance with the invention, an improved picking tool employs a trigger style actuator handle, and a head portion having changeable end portions to enable changing of the configuration of the grasping end of the picking tool for different uses.

Accordingly, it is an object of the present invention to provide an improved picking tool having a variable end portion.

It is a further object of the present invention to provide an improved picking tool that is adapted for grasping a variety of items comfortably.

It is yet another object of the present invention to provide an improved picking tool that is easy to use and light weight.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

The system according to a preferred embodiment of the present invention comprises a picking tool with a trigger style actuator to cause 2 arm members to pivot toward each other, to bring corresponding head members together for closing on an item to enable gripping and picking the item.

Figure 1:
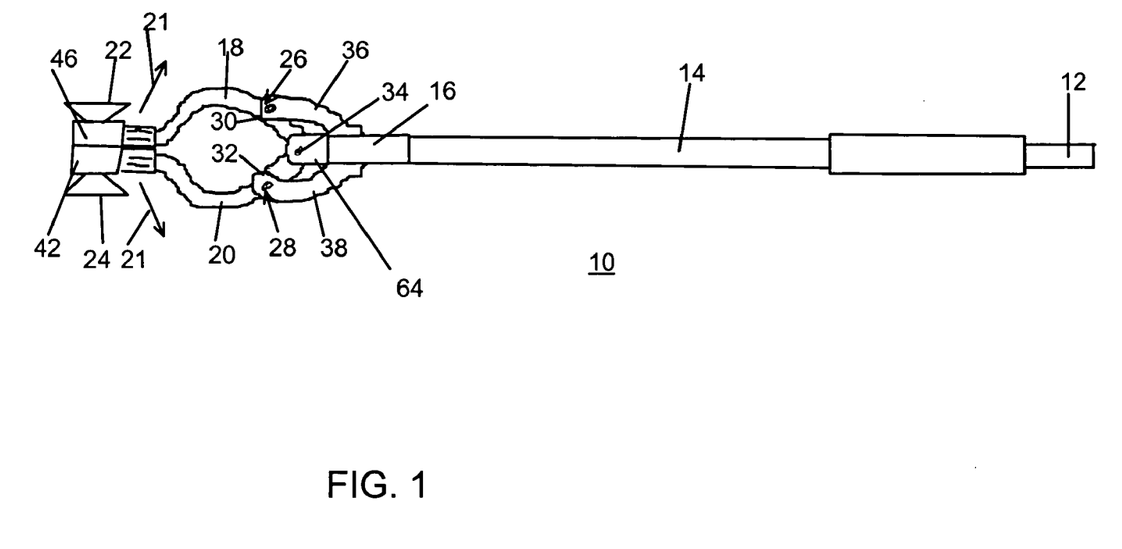
FIG. 1 top view of a picking tool according to the invention.
Figure 2:
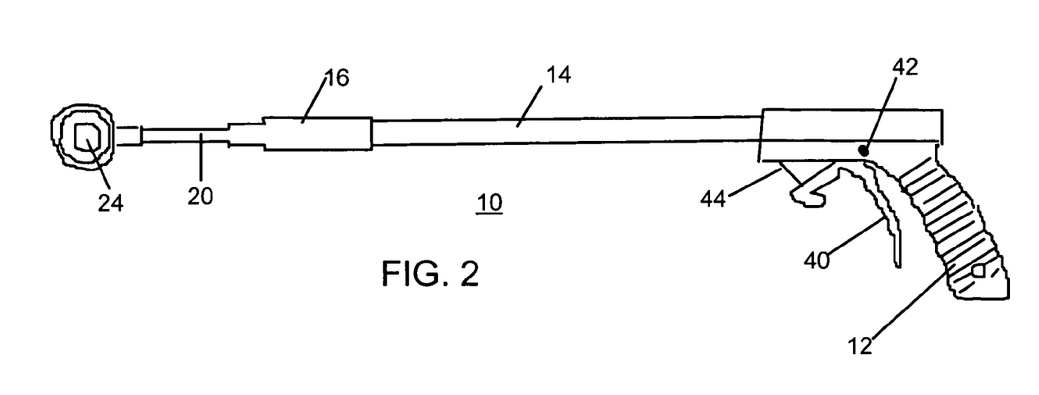
FIG. 2 is a side view of the picking tool of FIG. 1, with the trigger in the actuated position.

Referring to FIG. 1 and FIG. 2, which are top and side views of the picking tool 10 with the tool in the closed position, the tool includes a handle portion 12, suitably including a TPR rubber covering, for comfort to the user's hand. The handle portion 12 is connected to an elongate extension member 14, having at the end distal from the handle portion, an actuation head portion 16. The head portion pivotally mounts arms 18 and 20, said arms carrying end effectors 22 and 24 thereon. The head portion includes fixed arm members 36 and 38, having pin member 26 and 28 at the distal ends thereof, the pin member 26 and 28 being engaged with an elongate slot portion 30, 32 of the respective arms 18 and 20. End portions of arms 18 and 20 are pivotally held to the head portion 16 by pin 34 through respective holes (not visible in FIGS. 1 and 2) in the arms 18 and 20.

In FIG. 2, it may be observed that the picking tool handle supports a trigger member 40 which is pivotally carried by the handle portion 12, pivoting about pivot position 42. A cable 44 is engaged by the trigger member, the opposite end of the cable being attached to a portion of the head 16 as discussed hereinbelow. Actuation of the trigger to the position show in FIG. 2, pulls the cable which causes the two arms 18, 20 and end effectors 22, 24, to be in the position shown in FIG. 1. Cable 44 extends through the elongate extension member 14, which suitably is in the form of a hollow rod so as to have a space therein to receive the cable along the extent thereof.

Figure 3:
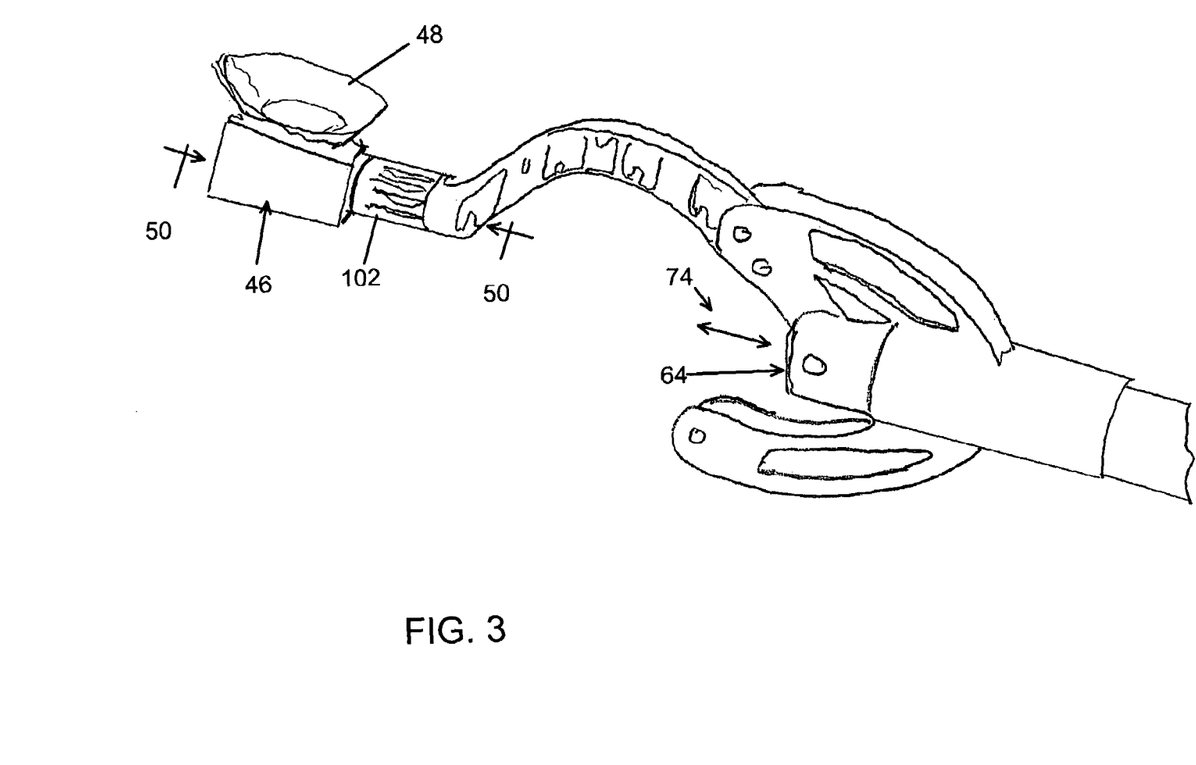
FIG. 3 is a perspective view of the head portion of the picking tool, with one arm removed.
Figure 4:
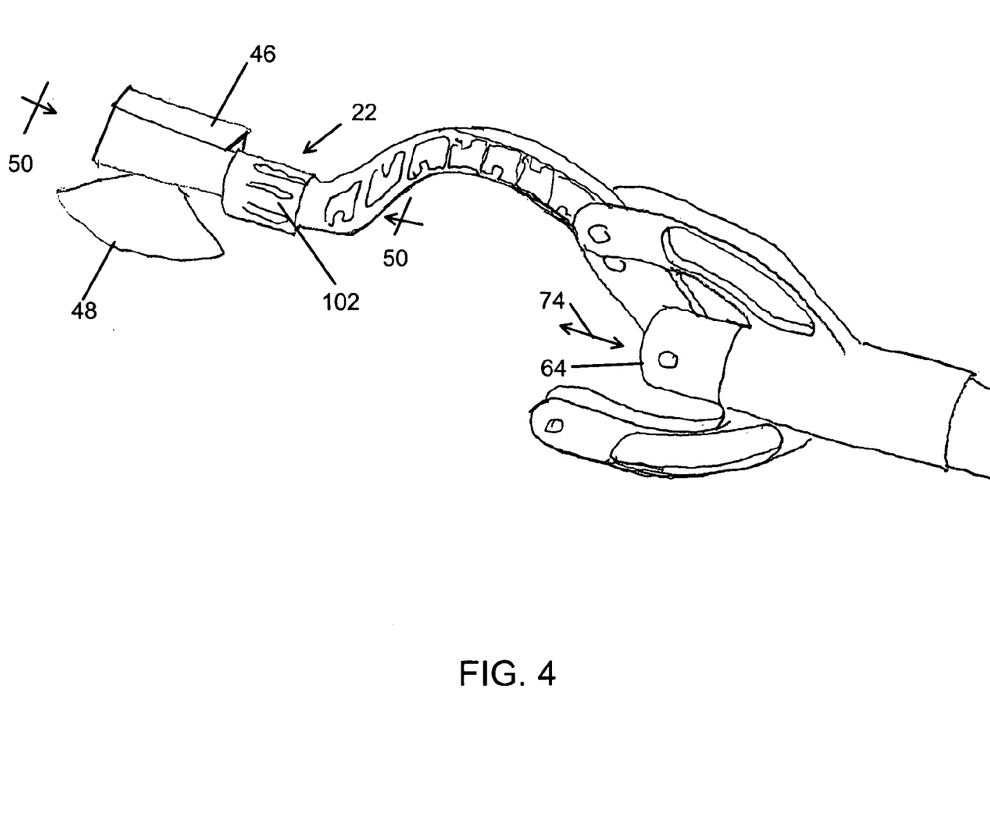
FIG. 4 is an alternate perspective view of the head portion of the picking tool, with one arm removed, with the end effector switched to the alternate configuration.

Referring now to FIGS. 3 and 4, perspective views of the head end of the picking tool, with arm portion 20 removed for illustration purposes, it may be observed that the end effector 22 (and also end effector 24) may assume 2 different orientations. In FIG. 3, the end effector is positioned such that a flat face 46 is oriented toward the center, such that on actuation of the trigger, the two flat faces 46, 48 of the end effectors 22, 24 will meet, as in FIG. 1, to provide a flat gripping surface to the end effectors. In FIG. 4, the end effector 22 is rotated 180 degrees on the axis 50-50, so that the cup-like face 48 is oriented toward the center, so as to provide a cup like grasping shape to the end effectors.

Figure 5:
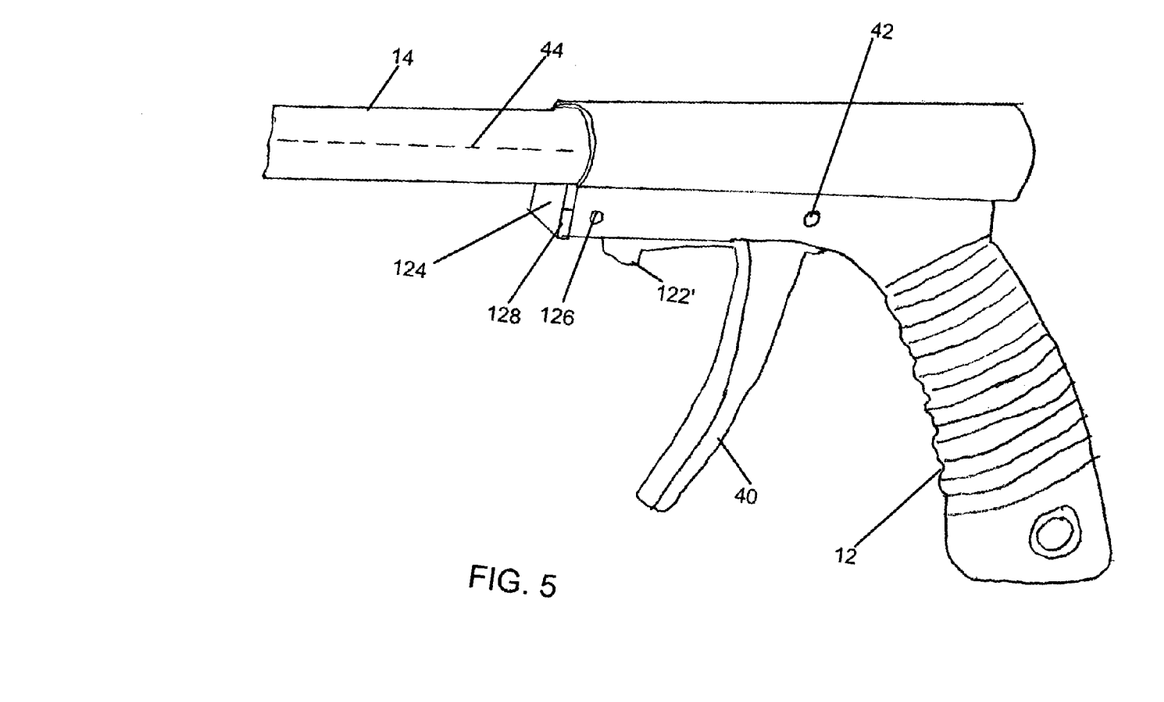
FIG. 5 is a perspective view of the handle and actuator trigger portion of the picking tool, with the trigger in the position when not actuated.

Referring to FIG. 5, a perspective view of the handle and actuator trigger portion of the picking tool, with the trigger in the position when not actuated, the trigger 40 moves forwardly of the handle portion when in the un-actuated position. The trigger is spring biased by its engagement with the cable, as discussed below, to be in the un-actuated position in absence of being pulled toward the handle by a user.

Figure 6:
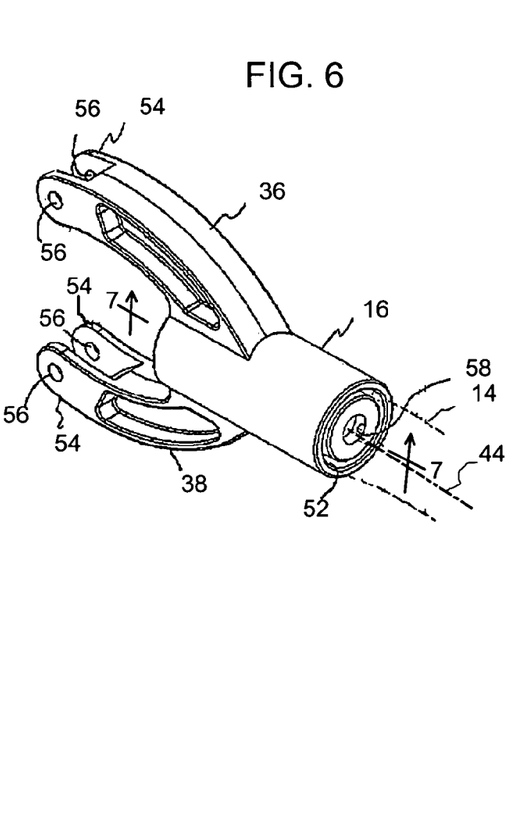
FIG. 6 is a view of the head portion 16 in a disassembled state.

Referring now to FIG. 6, a view of the head portion 16 in a disassembled state, extension member 14 (illustrated in phantom) is received into a corresponding shaped receiving portion 52 so as to fit the extension member 14 and head 16 together. The body of head 16 defines a tubular portion that carries arms 36 and 38, which project forwardly in an arcuate shape, having parallel tangs 54 with holes 56 therein, so as to define the pivot positions 26 and 28. A through bore 58 is formed in the end of head 16 at the region where extension member 14 is engaged.

Figure 7:
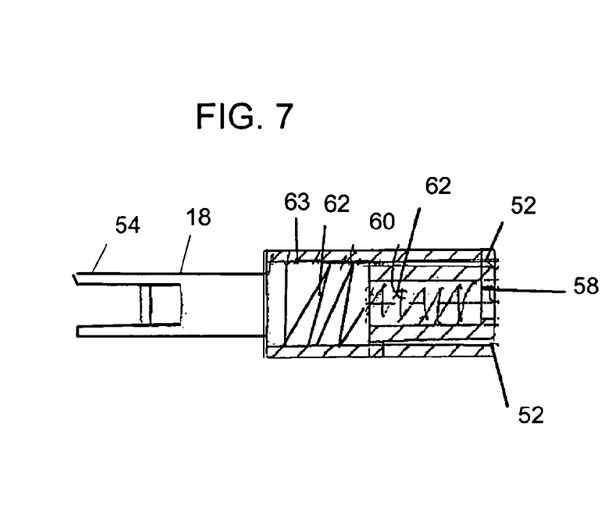
FIG. 7 is a sectional view of the head portion taken along line 7-7 of FIG. 6.
Figure 8:
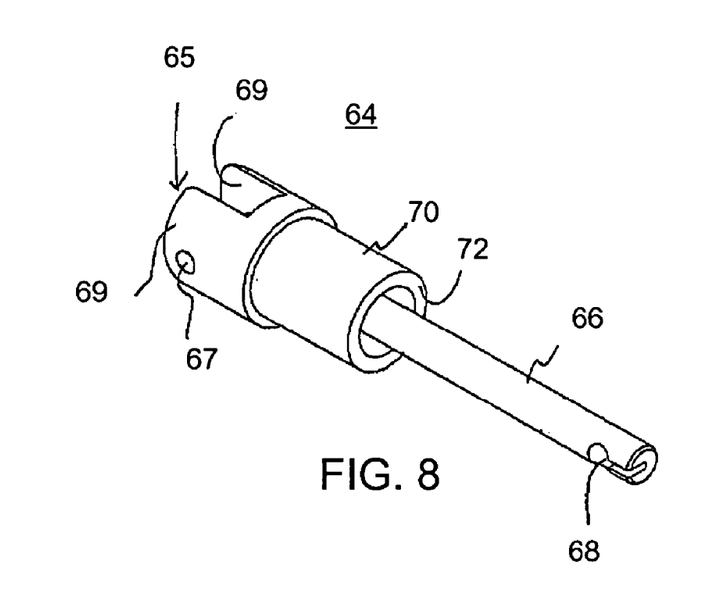
FIG. 8 is a perspective view of a link member.

FIG. 7 is a sectional view of the head portion 16, taken along line 7-7 of FIG. 6, wherein it may be observed that the interior of the tube-shaped portion of head 16 includes a space defined therein with a seat portion 60, and a narrower diameter portion as it approaches the extension member 14 whereby a spring 62 may be received in the narrower portion and, when in its extended configuration, will extend into the wider portion 63, to provide spring bias to the picking tool to an open position in conjunction with the link member of FIG. 8.

Referring now to FIG. 8, a perspective view of a link member 64, the link member comprises a narrow central extension 66 having a cable engaging portion 68 at the end thereof, for receiving and engaging cable 44. A tubular portion 70 is provided and of a size so as to slidingly fit within the interior 63 of head 16 where spring 62 is positioned. The spring engages with face 72 of the link member, to bias it towards and extended configuration. A wider head portion 65 has bores 67 therethrough, with parallel tang portions 69 defining an opening therebetween.

When the picking tool is assembled, member 64 fits into opening 63 of head 16, and portion 66 extends on through opening 58 so as to be accessible to engage cable 44 at portion 68. Referring to FIG. 3, which illustrates the picking tool with link portion 64 inserted into head 16, it may be observed that the link is adapted for translation inwardly and outwardly of the head portion, as noted by arrow 74.

Figure 9:
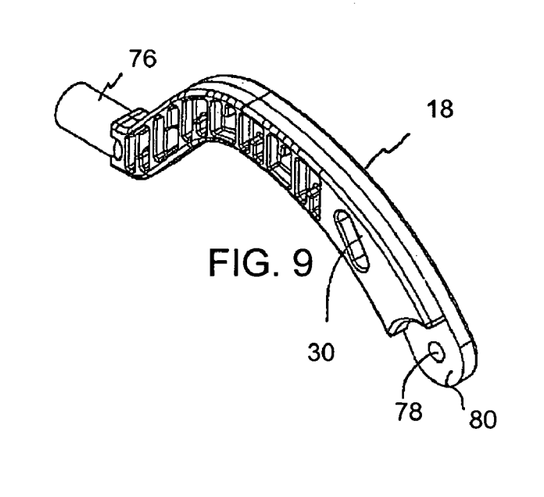
FIG. 9 is a perspective view of arm 18.
Figure 10:
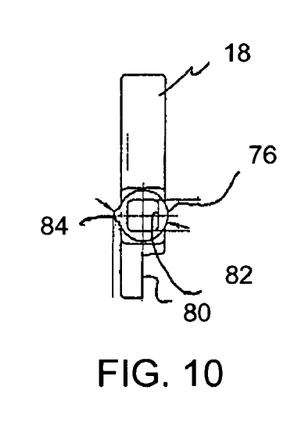
FIG. 10 is an end view of arm 18.
Figure 11:
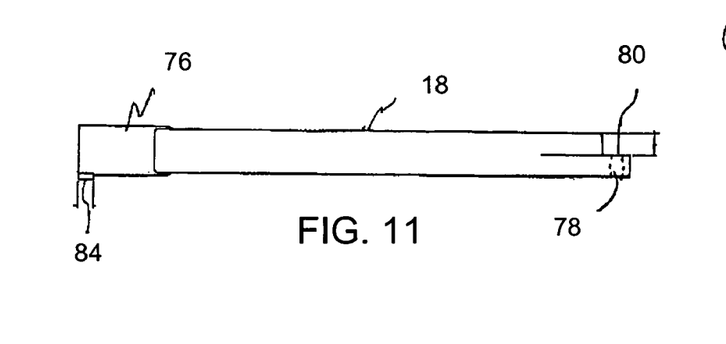
FIG. 11 is a bottom view of arm 18.

FIGS. 9, 10 and 11 are a perspective, end and bottom view of arm 18. The arm is substantially arcuate, having a cylindrical end post 76 positioned at the distal end of the arm. Elongate slot portion 30 is defined in a portion of the arm closer to the arm end having a bore 78 defined in a tang portion 80 of the arm 18.

Referring to FIG. 10, an end view of the arm 18, end post 76 includes a square central bore 82 extending at least partially into the extent thereof. The exterior of the post is substantially cylindrical in shape, but carries a protrusion 84 on one edge at the distal end of the post, extending a short distance toward the base of the post.

When assembled, two such arm portions, arm 18 and arm 20 (which is substantially identical in configuration to arm 18), are positioned, with one arm flipped around such that the corresponding tang portions 80 of the two arms face each other and are positioned in the opening between tang portions 69 of the link member, and a pivot pin 34 is mounted through bores 67 and 78. The pin is suitably configured to be fixed into place once mounted, so as to be retained in position while still allowing pivoting movement about the pin.

Further, the arm portions are positioned such that slot portions 30 are positioned between respective tangs 54 of the corresponding arms 36 and 38 of head portion 16, whereupon a pin member 26 (28) is passed through the openings 56 of the tangs 54 so as to provide a sliding engagement with the arm 36 and slot 30 (32) of arm 18 (20).

Figure 12:
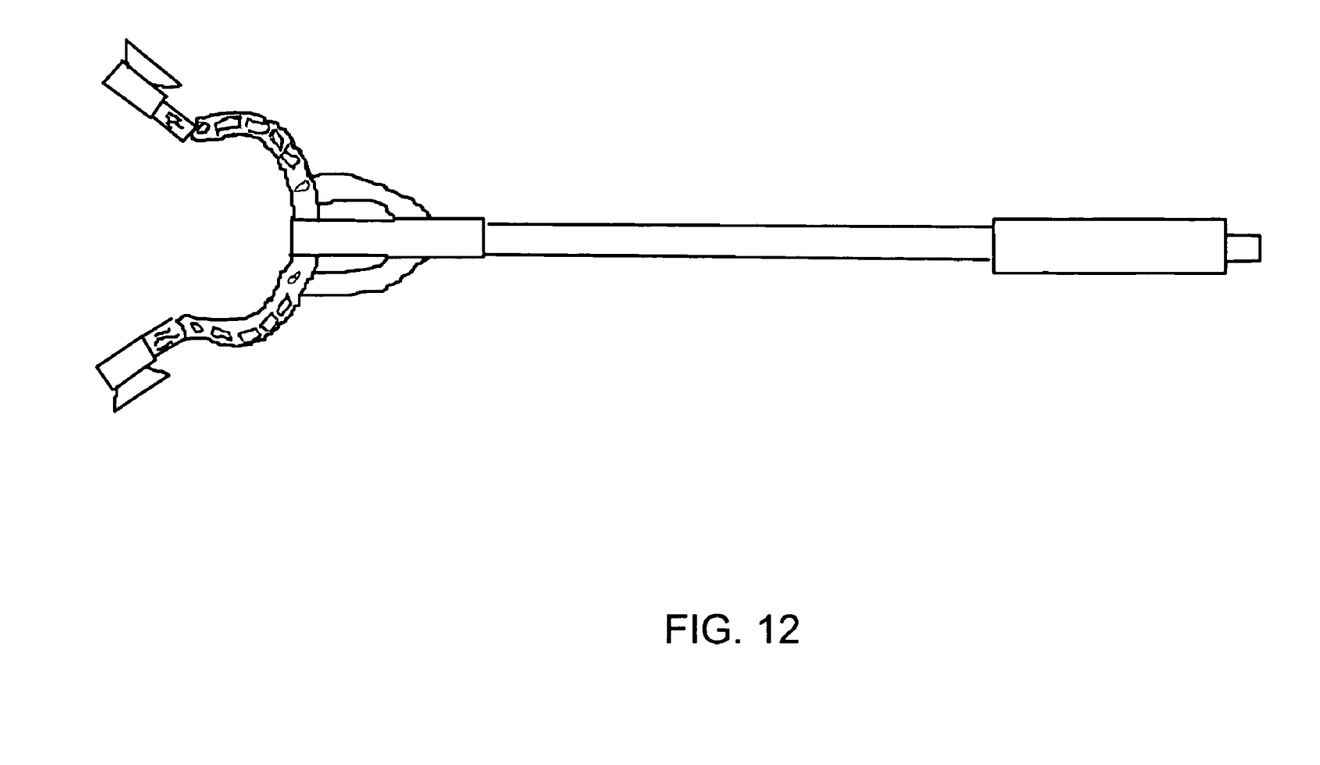
FIG. 12 is a top view of the picking tool in the open position.

Now, the cable 44 is engaged at portion 68 of the link member 64, and is correspondingly engaged with the trigger member 40, whereupon the interaction of the spring and link member and head portion, will spring bias the link portion outwardly of the head and the arms 18 and 20 will move outwardly in the direction of arrows 21 (FIG. 1). FIG. 12, a top view, illustrates the picking tool in the open configuration, when the trigger member is in the position of FIG. 5, not pulled.

FIGS. 13A-19 illustrate the end effectors and the construction and operation thereof.

Figure 13A:
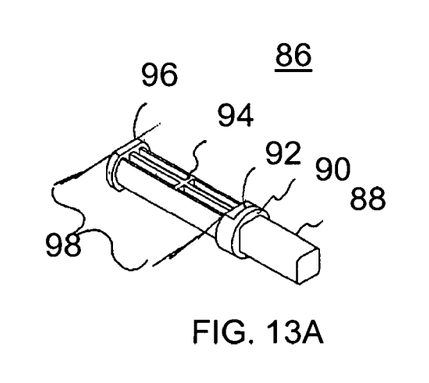
FIG. 13A is a perspective view of a stick member.
Figure 13B:
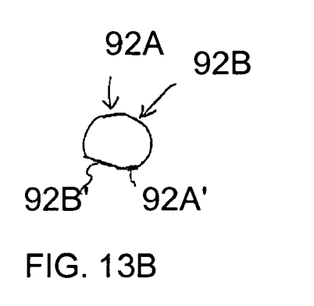
FIG. 13b is a cross sectional view of the shape of the portion 92 of the stick.

FIG. 13A is a perspective view of a stick member 86, which has one end 88 in a square cross section configuration, sized to be received within the square central bore 82 of end post 76. A seat portion 90 on stick 86 is provided of sufficient diameter to act as a stop to define the extent to which the end 88 of stick 86 will extend into bore 82. Alternatively, this extent may be defined by the length of portion 88 and the depth of bore 82. Above seat portion 90, two flat notch portions 92 are defined on opposite faces of the stick, comprising a first portion 92A and a second portion 92B at an angle thereto. FIG. 13B illustrates the cross sectional configuration of the notch portions 92A and 92B. Above the notch portions on the stick is a slightly narrower region 94, ending in a top cap 96.

Figure 14:
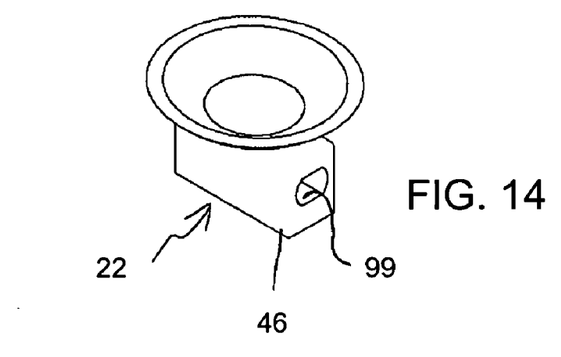
FIG. 14 is a perspective view of an end effector.
Figure 15:
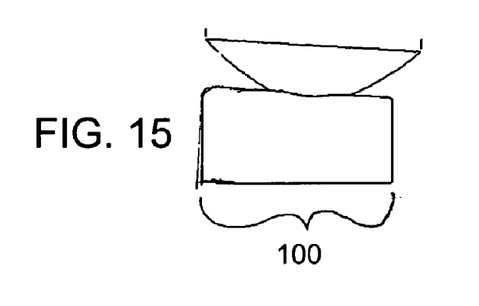
FIG. 15 is a side view of an end effector.

Referring to FIG. 14, a perspective view of an end effector 22, it may be noted that the end effector includes a bore 99 substantially centrally of the portion defining the flat face 46 thereof. The shape and diameter of the bore corresponds to that shape and diameter of the portion 96 of stick 86. The length of region 98 may be substantially the same as the length 100 of the end effector as in FIG. 15, a side view thereof.

Figure 16:
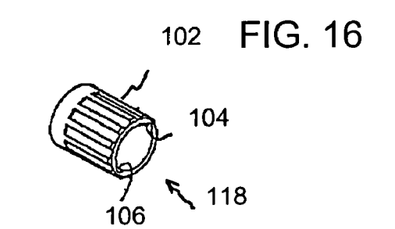
FIG. 16 is a perspective view of a lock/turning mechanism.
Figure 17:
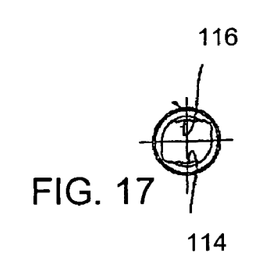
FIG. 17 is a top end view of the lock/turning mechanism of FIG. 16.
Figure 18:
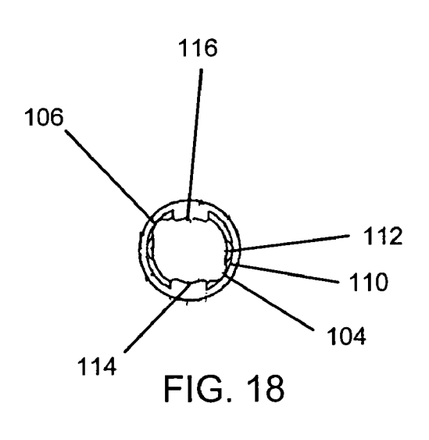
FIG. 18 is a bottom end view of the lock/turning mechanism of FIG. 16.
Figure 19:
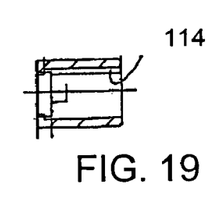
FIG. 19 is a sectional view of the lock/turning mechanism of FIG. 16.

FIGS. 16-19 are views of a turning/lock member. FIG. 16 is a perspective view, wherein the lock/turning member 102 is of a hollow cylinder configuration and has indentations on the exterior thereof for gripping by a user. The view in FIG. 16 may be considered as from the "bottom" of the lock member, and left and right slots 104, 106 are defined 180 degrees apart in the interior of the lock member. The slots 104, 106 extended a substantial length of the lock member, and near the opposite end of the lock member (but not all the way to the end) a ridge portion 110 is defined radially adjacent the slot 104 and an adjacent divot 112 is positioned radially adjacent the ridge portion 110. A corresponding ridge and divot are defined on the opposite side, adjacent slot 106. Inwardly extending tab portions 114 (and 116) are defined adjacent slot 104 (and 106), positioned on the other side of the slot 104 from ridge and divot 110 and 112.

The components of FIGS. 13-19 interact, together with end post 76, to provide multiple configurations to the end effector, which may be desired depending on the particular use for which the picking tool is being employed.

In assembling to tool, the end 96 of stick 86 is inserted into the lock/turning member in the direction of arrow 118 of FIG. 16, with the two items being positioned such that portions 114 and 116 of the lock/turner are matched to notch portions 92. Next, the end effector may be positioned onto the stick to cover portion 94. The end effector operates to maintain the relation of the lock/turner to the stick.

Next, the square cross section portion 98 of the stick may be placed into the corresponding bore 82 of the respective arms 18 or 20. The square configuration of the bore 82 and stick, together with the protrusion 84, the slots 102, 104 and the tab portions 114, 116, operate to define two alternate positions in which the stick may be inserted into the bore 82, the two positions being 180 degrees out of phase.

Once the stick is so inserted into the bore, the user may rotate the turner 102 clockwise so that the protrusion 84, which has ridden in either slot 104 or 106, rides over ridge portion 110 so as to rest in divot 112, operating as a lock to engage the end effector onto the end of the picking tool so as to not fall off thereof. The user may then operate the picking tool to grasp and pick items as desired, by pulling the trigger member, which will cause the arms 18 and 20 to move together from the configuration of FIG. 12, toward the configuration of FIG. 1, to grasp the item between the end effectors.

To change to the other style of end effector, the user grasps and rotates lock/turner member 102 counterclockwise so as to rotate the turner such that portion 84 is moved out of divot 112, over portion 110, to be aligned again with slot 104. Then the end effector (including the stick and lock/turner) may be pulled out of engagement with bore 82, rotated 180 degrees so as to position the other effector face in position, and then the stick portion is re-inserted to bore 82. It will be understood that having rotated the end effector configuration 180 degrees, it is now the slot 116 on the opposing side of the lock member, and the corresponding adjacent ridge portion and divot, that will interact with protrusion 84 to lock the end effector in place.

Figure 20:
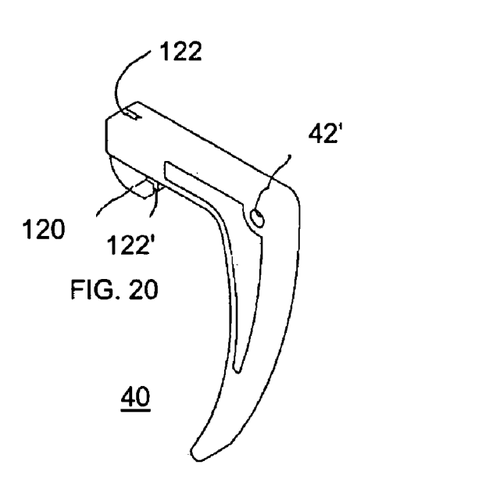
FIG. 20 is a perspective view of the trigger.

FIG. 20 is a perspective view of the trigger member 40, wherein a bore 42' is formed therein to interact with a pin or the like to define pivot 42 as discussed in connection with FIG. 5. A cable engaging portion 120 is defined at the bottom front end of the trigger member, with a slot 122 being defined therein and extending up to the top of the front of the trigger, to receive cable 44 therein. Once cable 44 is positioned behind the engaging portion 120, the rearward portion 122' (for example) may be suitably filled in or otherwise closed up, to prevent the cable from inadvertently becoming detached from the trigger. This may be accomplished by insertion of a wedge or closing piece or by gluing or fusing the opening 122'.

Figure 21:
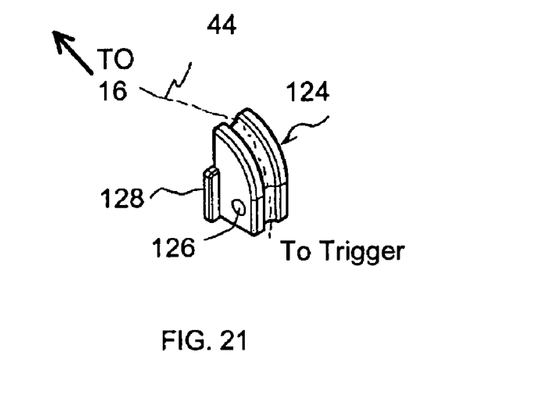
FIG. 21 is a perspective view of a cable guide way employed in the handle member.

Referring to FIG. 21, a cable guide way 124 is provided to guide the cable from the trigger/handle portion and position it relative to the extension portion 14. A bore 126 (FIG. 5) in the handle member corresponds to a bore 126' in the guide way, for securing the guide way with a pin, for example, to the handle. Left and right tang member 128 of the guide way operate to engage the guide way with the handle member 16.

The various components of the picking tool are suitably made of various plastic materials, although extension member 14 is an aluminum tube in a preferred embodiment. The end effectors are of a rubber type material, to provide a flexible aspect to the cup portions thereof and the flat portions, for better gripping of items being picked. The various pivot pins may suitable be metal rivets, for example. Cable 44 is suitably a steel cable, such as stainless steel.

Accordingly, a picking tool is provided that is easy to use with end effectors that can be changed to different configurations to provide varied picking capabilities.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A picking tool comprising:
   an actuable jaw portion having first and second arm portions mounted for opening and closing movement thereof relative to one another;
   an end effector having a first picking face portion on a first side and a second picking face portion on a second side; and
   a mounting member for adjustable mounting said end effector to one of said first and second arm portions, said mounting member enabling adjusting of the end effector to selectively position the first picking face portion or the second picking face portion to an operative position for engaging with an item to be picked, said mounting member having a rotatable lock member for rotating between a locked position and an unlocked position, for enabling adjusting of said end effector to switch between the first face portion and the second face portion being in an operative position when said lock member is in the unlocked position and for securing said first or second face portion in the operative position when in the locked position,
   wherein said rotatable lock member comprises a first and second interior slot portions positioned 180 degrees apart and one of said first and second arm portions comprises a corresponding protrusion adapted for engagement in either of said first and second slots.

2. A picking tool according to claim 1, comprising a second end effector mounted to the other of said first and second arm portions.

3. A picking tool according to claim 2, further comprising a second mounting member for adjustable mounting said second end effector to the other of said first and second arm portions, said second mounting member enabling adjusting of the second end effector to selectively position a first or the second picking face portion to an operative position for engaging with the item to picked, said second mounting member having a second rotatable lock member for rotating between a second locked position and second unlocked position, for enabling adjusting of said second end effector to switch between the first face portion and the second face portion thereof to an operative position when said lock member is in the unlocked position and for securing said first or second face portion in the operative position when in the locked position.

4. A picking tool according to claim 3, wherein said first face portion of said second end effector comprise a cupped portion.

5. A picking tool according to claim 4, wherein said second face portion of said second end effector comprise a substantially flat portion.

6. A picking tool according to claim 3, wherein said second face portion of said second end effector comprise a substantially flat portion.

7. A picking tool according to claim 1, wherein said first face portion of said end effector comprise a cupped portion.

8. A picking tool according to claim 7, wherein said second face portion of said end effector comprise a substantially flat portion.

9. A picking tool according to claim 1, wherein said second face portion of said end effector comprise a substantially flat portion.

10. A picking tool according to claim 1, wherein said rotatable lock member comprises a first and second ridge portion adjacent said first and second slot portions.

11. A picking tool according to claim 10, wherein said rotatable lock member further comprises first and second divot portions adjacent said first and second ridge portions.

12. A picking tool according to claim 11, wherein locking is effected by rotation of said rotatable lock member so as to position said ridge member in one of said divot portions.

13. A picking tool according to claim 11, wherein unlocking is effected by rotation of said rotatable lock member so as to position said ridge member in one of said slot portions.

14. A picking tool comprising:
- an actuable jaw portion having first and second arm portions mounted for opening and closing movement thereof relative to one another,
- a first and second end effector adapted for positioning on said first and second arm portions, said end effectors having a first picking face portion on a first side and a second picking face portion on a second side; and
- first and second mounting member for adjustable mounting said end effectors respectively to said first and second arm portions, said mounting members enabling adjusting of the end effectors to selectively position the first picking face portion or the second picking face portion to operative positions for engaging with an item to picked, said mounting members having a rotatable lock member for rotating between a locked position and an unlocked position, for enabling adjusting of said end effectors to switch between the first face portion and the second face portion being in an operative position when said lock member is in the unlocked position and for securing said first or second face portion in the operative position when in the locked position,
- wherein said rotatable lock members comprises a first and second interior slot portions positioned 180 degrees apart and said first and second arm portions carry a corresponding protrusion adapted for engagement in either of said first and second slots.

15. A picking tool according to claim 14, wherein said first face portions of said end effectors comprise a cupped portion.

16. A picking tool according to claim 14, wherein said second face portions of said end effectors comprise a substantially flat portion.

17. A picking tool according to claim 14, wherein said rotatable lock members comprises a first and second ridge portion adjacent said first and second slot portions.

18. A picking tool according to claim 17, wherein said rotatable lock members further comprise first and second divot portions adjacent said first and second ridge portions, wherein locking is effected by rotation of said rotatable lock member so as to position said ridge member in one of said divot portions and wherein unlocking is effected by rotation of said rotatable lock member so as to position said ridge member in one of said slot portions.

* * * * *